United States Patent
Gammel et al.

(10) Patent No.: US 10,515,206 B2
(45) Date of Patent: Dec. 24, 2019

(54) PROGRAM-INSTRUCTION-CONTROLLED INSTRUCTION FLOW SUPERVISION

(75) Inventors: Berndt Gammel, Markt Schwaben (DE); Stefan Mangard, Munich (DE); Steffen Sonnekalb, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 1725 days.

(21) Appl. No.: 13/409,369

(22) Filed: Mar. 1, 2012

(65) Prior Publication Data

US 2012/0233446 A1  Sep. 13, 2012

(30) Foreign Application Priority Data

Mar. 7, 2011  (DE) .................. 10 2011 005 209

(51) Int. Cl.
*G06F 21/52* (2013.01)
*G06F 21/54* (2013.01)
*G06F 9/48* (2006.01)

(52) U.S. Cl.
CPC ............ *G06F 21/52* (2013.01); *G06F 9/4812* (2013.01); *G06F 21/54* (2013.01)

(58) Field of Classification Search
None
See application file for complete search history.

(56) References Cited

U.S. PATENT DOCUMENTS

| | | | |
|---|---|---|---|
| 4,488,227 A | 12/1984 | Miu et al. | |
| 5,274,817 A | 12/1993 | Stahl | |
| 5,974,529 A | 10/1999 | Zumkehr et al. | |
| 7,168,065 B1 | 1/2007 | Naccache et al. | |
| 2010/0325733 A1 | 12/2010 | Honda | |

FOREIGN PATENT DOCUMENTS

| | | |
|---|---|---|
| CN | 1350675 A | 5/2002 |
| CN | 101042670 A | 9/2007 |
| CN | 101617322 A | 12/2009 |
| FR | 2849226 A1 | 6/2004 |

OTHER PUBLICATIONS

Galla, T. et al. "Control Flow Monitoring for a Time-Triggered Communication Controller." 10th European Workshop on Dependable Computing (EWDC-10). May 1999. pp. 1-6.

*Primary Examiner* — George Giroux
(74) *Attorney, Agent, or Firm* — Murphy, Bilak & Homiller, PLLC

(57) ABSTRACT

A signature module calculates a signature during the execution of a program by a central processing unit based on program instructions to the central processing unit, and stores the signature in a signature register of the signature module. The signature module includes: a calculation unit configured to generate a signature value based on program instructions executed on the central processing unit; and an instruction information interface configured to receive at least one item of instruction information from the central processing unit which indicates whether an instruction currently being executed by the central processing unit was jumped to indirectly or directly.

39 Claims, 10 Drawing Sheets instruction flow control with interrupts with
unprotected intermediate interrupt interrupt #0
protected
instructions
SIG on interrupt #1 does not
have to be protected (according
to decision of s/w developer)
→ interrupt #1 unprotected
instructions
SIG off interrupt #2 has to be protected
(according to s/w developer decision)
→ interrupt #2 s/w stores in     SIG on
local variables   for interrupt #2 protected
instructions
SIG on

IRQ 1                    IRQ 2

| CPU interrupt # | 0 | 1 | 0 | 2 | |
|---|---|---|---|---|---|
| SIG — "—" | 0 | 0 | 0 | 2 | |
| SIG on/off | on | off | off | off | on |
| | (CPU interrupt = SIG interrupt) | (CPU interrupt ≠ SIG interrupt) | (CPU interrupt ≠ SIG interrupt) | (CPU interrupt # SIG interrupt) | (takeover only with clock signal) |

FIG 6A

| FIG 6 |
|---|
| FIG 6A | FIG 6B |

PROGRAM-INSTRUCTION-CONTROLLED INSTRUCTION FLOW SUPERVISION

PRIORITY CLAIM

This application claims priority to German Patent Application No. 10 2011 005 209.7 filed on 7 Mar. 2011, the content of said application incorporated herein by reference in its entirety.

BACKGROUND

When a program (software) is executed on a central processing unit (hardware), it is generally expected that the program will actually also be executed in the manner intended by the compiler at the compiling time. In reality, however, the execution of a program or of a code can deviate from the program sequence originally planned. By way of example, faults in the hardware, interference signals or else targeted, malicious manipulations on the central processing unit can be responsible for this. Faults in the hardware can be attributed, for example, to undesired line short circuits, line interruptions or hung switching elements (so-called "stuck-at faults"), to name a few frequently occurring types of hardware faults. Interference signals can occur during the operation of the central processing unit for example as a result of electromagnetic fields or else in the form of extreme temperatures lying outside the temperature range provided for the central processing unit. Malicious manipulations of the hardware can be effected for example by the short-circuiting of selected contacts, line interruptions or laser irradiation of the central processing unit and/or of a memory connected to the central processing unit. The types of faults mentioned can occur for example within the central processing unit itself, within a memory in which the program is stored, within further components of a system comprising the central processing unit, or in electrical connections between the components of the computer system. In order to detect such faults during the execution of the program, an instruction flow supervision can be carried out.

For the purposes of the instruction flow supervision, a check value resulting from the instructions of the program to the central processing unit is generally calculated during the program creation. By way of example, it is possible to add the operation codes (opcodes) of the instructions in order in this way to form a checksum. In the case of a linear program, which is generally executed from the beginning of the program to the end of the program including all intervening instructions, it is thus possible to calculate a single checksum (or more generally a check value), which can be checked at the end of the program or after the end of the program. For this check, in parallel with the execution of each instruction by the central processing unit, the value of the instruction (for example in the form of the opcode present as a bit pattern) is taken into account computationally with the content of a specific register, e.g. added to the register content or logically combined with the register content bit by bit using an exclusive-or (XOR) operation. As soon as all the instruction values have been taken into account in this way in the specific register, the resulting value of the specific register can be compared with a reference check value in order to ascertain whether there is a match between the two values. If there is a match, proper execution of the program can generally be assumed, that is to say that the program has actually been executed in the manner planned at the point in time of program creation. The reference check value can be stored for example as a constant in the program code. Depending on how and in what programming language the program was created, the reference check value can be calculated by a compiler and written into the program code.

Programs often have branches in the program flow, which can also be regarded as "conditional jumps". After a branch, the program can be continued on at least two paths, the decision about which of the two or more possible paths is chosen arising only at the running time of the program through the evaluation of a condition. It should be noted that branch points with more than two possible branch paths can generally be divided into elementary branch points, i.e. into branch points each having only two possible branch paths. For the value calculated during the running time of the program, this means that it is dependent on which paths were traversed how often. In order that for example toward the end of the program or at some other point within the program sequence, a comparison between the current check value and a reference check value defined for the point can be carried out, there is the possibility of mutually orienting the check value within the different paths can that be traversed. This can be effected in a form such that the compiler incorporates into one path one or more instruction(s) inherently superfluous for the program sequence, the instruction(s) altering the check value in such a way that the path, at a junction point with another path, has the same check value as this other path.

Besides branch points which occur within a program and are defined by the code of the program, it can also happen that the processing of the program by the central processing unit is temporarily interrupted in order to execute or continue another program. Such an interruption is designated by the term "interrupt". A further possibility, of which use is made relatively frequently in the programming of programs for computer systems and similar systems, consists in a specific program calling a function present in another program (for example a program library ("software library")). Since the function or subroutine defined in the program library was not usually compiled jointly with the main program, it is generally not possible to include the subroutine in the check value calculation of the main program. If an instruction flow supervision is also intended to be carried out for the subroutine or subprogram, then the subroutine can be tested separately using a dedicated check value. The check value of the subprogram is thus independent of the check value of the main program. Faults which occur in connection with a change in the central processing unit from processing the main program to processing the subprogram, or vice versa, often remain undiscovered.

SUMMARY

Exemplary embodiments of the present invention provide a device for executing a program, the device comprising a central processing unit and a signature module. The signature module is a component which serves for instruction flow supervision of the execution of the program on the central processing unit. Further exemplary embodiments of the present invention provide a signature module, which is designed to calculate a signature during the execution of a program by a central processing unit on the basis of program instructions to the central processing unit, and to store the signature in a signature register of the signature module. Further exemplary embodiments of the present invention provide a method for calculating a signature on the basis of instructions executed by a central processing unit during the execution of a program, and for storing the signature in a signature register of a signature module.

Further exemplary embodiments disclosed herein provide a device for executing a program, the device comprising a central processing unit and a signature module, wherein the signature module is designed to calculate a signature on the basis of instructions and to store it in a signature register. Calls of interrupt routines or subroutines can occur during the execution of the program by the central processing unit. In this connection, the device for executing the program is designed: if a call of an interrupt routine takes place, to read out the signature assigned to the interrupted program from the signature module by means of a program instruction of the interrupt routine and to store it, and to write the stored signature to the signature register before leaving the interrupt routine by means of a program instruction of the interrupt routine.

Additionally or alternatively, the device for executing the program can be designed to: if a call of a subroutine takes place, to adapt the signature in the signature register to a signature of the subroutine before the call of the subroutine by means of a program instruction that brings about a relative change in the signature, and, after a return from the subroutine, by means of a further program instruction that brings about a relative change in the signature, to adapt the signature in the signature register to a signature of the program section from which the call of the subroutine took place.

At least one aim of the technical teaching disclosed is to safeguard the program flow by means of instruction signatures against fault attacks or else against random faults, particularly in specific program structures. Security controllers, in particular, are a frequent target of malicious fault attacks, but other types of computer systems and/or central processing units are also subjected to such fault attacks. As mentioned above, the basic principle of instruction signatures involves, at the running time of a program, summing the executed instructions in a checksum (signature) and checking it against reference values at predefined points.

In order to safeguard nested functions or interrupt routines (also designated as "interrupt service routine" (ISR)), heretofore use has been made of automatic stack mechanisms ("stacking") in the hardware in order to save signature values upon the calling of functions or interrupt routines.

Owing to the need for automatic stack use, previous methods have often required architecture changes in existing standard processors (such as e.g. processors based on the ARM architecture), in order that an instruction flow supervision that is all-embracing in respect of function calls can be implemented. Moreover, the stack access can lead to lower performance. A further point that should be taken into consideration is that the memory, and in particular the so-called "random access memory" (RAM), is a limited resource in embedded systems and is thus additionally burdened by the signatures.

The technical teaching disclosed herein relates to the technical field of methods and devices for instruction signatures which manage without automatic hardware stack mechanisms (including for interrupts and subroutines) for the purposes of instruction signature processing. The technical teaching disclosed herein does not, however, rule out the use of such hardware stack mechanisms in principle.

In accordance with the technical teaching disclosed herein, both in connection with a call of an interrupt routine and in connection with a call of a subroutine, an accompanying reconfiguration of the signature or of the signature register is controlled by means of program instructions, such that a hardware-based stack use can be avoided. By means of program instructions (i.e. under software control), the signature stored in the signature register is accessed. Depending on the purpose and type of the program instruction, accessing the signature register can involve (buffer-) storing the signature, writing the signature (back) or updating the signature (for the purpose of orientation of the signature). Other forms of data processing which concern the signature are likewise conceivable in principle.

In accordance with further exemplary embodiments, the device for executing the program can be furthermore designed to carry out a check of the signature during the execution of the called interrupt routine or the called subroutine. A check of the signature in the context of the called interrupt routine or of the called subroutine can serve for ascertaining whether the interrupt routine or the subroutine was called correctly, that is to say for example for providing entry protection into the interrupt routine or the subroutine. Particularly in connection with subroutines, it is conceivable that the central processing unit and/or the program memory have/has been manipulated in such a way that, instead of a planned subroutine, a different subroutine is called, as a result of which more extensive manipulation possibilities could arise for a potential attacker. Through early detection of the erroneous entry into the subroutine, however, it is possible to prevent or reduce such manipulation possibilities.

In accordance with exemplary embodiments, the device for executing the program can furthermore be designed to save, by means of a program instruction, a state of the signature module for a routine being executed at the point in time of the call of the interrupt routine or of the subroutine, and/or to activate a signature calculation for the interrupt routine or the subroutine. The device for executing the program can furthermore be designed, before leaving the interrupt routine or if the return from the subroutine takes place, to reestablish the state of the signature module for the routine being executed at the point in time of the call of the interrupt routine or of the subroutine, by means of a program instruction. Saving and reestablishing the state of the signature module for the routine that is or was being executed at the point in time of the call of the interrupt routine or of the subroutine constitutes an alternative to the hardware stack use. Furthermore, for software developers the possibilities opened up for influencing the signature module management are greater in number and more flexible than would be possible with a purely hardware-aided signature management concept.

In accordance with further exemplary embodiments, the signature can be updated by the corresponding program instruction for adapting the signature, before the call of the subroutine takes place, such that, upon proper calling of the subroutine, the signature upon the call of the subroutine matches a start reference signature assigned to a start of the subroutine. This constitutes a possible embodiment of the entry protection into the subroutine as already mentioned above.

In accordance with further exemplary embodiments, the signature can be updated by the corresponding program instruction for adapting the signature in such way that, upon proper returning from the subroutine to the program or to the routine being executed at the point in time of the call of the subroutine, the signature at a defined point of the program matches a reference signature of the program assigned to the defined point. In this way, it is possible to provide a relatively reliable exit protection from the subroutine back to the program. The defined point can be provided, for example, shortly after a return point from the subroutine back into the program, such that shortly after carrying out the return it is possible to ascertain whether this return was correct.

In accordance with further exemplary embodiments, the return from the subroutine can be assigned an end reference signature value, which the signature in the signature register matches upon proper execution of the subroutine and which is also assigned to a return destination in the calling program section as reference signature value, wherein the signature in the signature register remains the same upon the return and is checked by the calling program section or is updated by means of a relative change in the signature in such a way that at a point in the calling program section a resulting signature value, upon proper execution, matches a second reference signature value assigned to the point in the calling program section.

In accordance with further exemplary embodiments, the start reference signature value and/or the end reference signature value can be derived as a function of an address or of a name of the subroutine.

In accordance with further exemplary embodiments, the start reference signature value and/or the end reference signature value can be chosen randomly, differently in pairs, identically for groups of functions or identically in each case for all functions. A group of functions can consist, for example, of a plurality of functions which serve a similar purpose (for example carrying out specific similar calculations, accessing specific data sources, etc.) or fulfill other similarity criteria (for example association with program libraries etc.). The criteria for the grouping of the functions can also be predefined by the programmer.

In accordance with exemplary embodiments, the device for executing the program can furthermore be designed to update the signature in the context of the interrupt routine or the subroutine by means of a program instruction, such that, upon proper execution of the interrupt routine or of the subroutine, the signature at a defined point of the interrupt routine or of the subroutine matches a reference signature assigned to the defined point of the interrupt routine or of the subroutine. The possibility—provided in accordance with the technical teaching disclosed herein—of influencing the signature or the signature register by means of a program instruction opens up the possibility of concomitantly including the signature calculation within the interrupt routine or the subroutine in the signature processing of the calling routine or of the program.

In accordance with further exemplary embodiments, the subroutine can be called in the form of an indirect function call. The adaptation of the signature can comprise determining an update value on the basis of a unique identifier of the subroutine and modifying the signature by means of the update value. In the case of indirect function calls, it can happen that it is only at the running time of the program that a decision is taken as to which function of possibly many functions is intended to be called, or where the function to be called is actually stored. This also affects the signature calculation, since likewise it is only at the running time that a decision can be taken as to in what way, i.e. by what value, the signature is to be adapted in order that, upon entry into the indirectly called function, it matches a reference signature defined within the indirectly called function.

In accordance with exemplary embodiments, the unique identifier of the indirectly called subroutines can be based on at least one of: a memory address of the subroutine; a name of the subroutine; a result of an assignment mapping for the identifier; an entry in an assignment table for the identifier; and a fixed constant, which is identical for all indirectly called functions.

At the running time of the program, the data are uniquely assigned to a subroutine, if appropriate also already beforehand. Since the update value is determined on the basis of the unique identifier, with this information the signature can be modified in such a way that it matches a start signature of the indirectly called function, at any rate in the case of a proper program sequence.

In accordance with further exemplary embodiments, determining the update value can comprise the evaluation of at least one of an evaluation of an update value mapping and an evaluation of an update value table. While the previous paragraph was concerned with the unique identifier of the indirectly called subroutine, here the actual update value of the signature is meant which ensures that the signature at a specific point within the program sequence matches the reference signature allocated to the point, independently of which program path was executed at one or more branch points. Since the instructions executed in the program paths available for selection are often known at the compiling time, it is possible to determine the update value mapping or the update value table into which the unique identifier (or a variable derived therefrom) is incorporated as the argument.

In accordance with further exemplary embodiments, the signature module can comprise the signature register.

In accordance with further exemplary embodiments, the signature module can comprise a signature calculation unit for providing the signature which is stored in the signature register. Typically, the signature value stored in the signature register is combined with a new instruction value in accordance with a specific computation specification. The computation specification can comprise a combination of the stored signature register content with the new instruction value by means of arithmetic operations (e.g. addition, multiplication) or operations in finite fields (e.g. cyclic codes, polynomial division).

In accordance with exemplary embodiments, the signature module can comprise an interrupt information interface with the central processing unit for receiving interrupt information from the central processing unit and an interrupt information evaluation unit for setting an activity state of the signature calculation unit, such that the signature calculation unit is active when at least one first condition of the interrupt information is present, and that the signature calculation unit is inactive when at least one second condition is present, and the signature register maintains a signature determined last by the calculation unit over a corresponding inactivity period. If the signature calculation unit is active, in the course of an interrupt routine being carried out, a signature is calculated on the basis of program instructions of the interrupt routine and is stored in the signature register. Via the interrupt information interface, the signature module receives information about which interrupt routine is being executed at that time by the central processing unit. The signature module can thus check whether a signature calculation is to be carried out for this interrupt routine, which can depend on what sought of state the signature module is currently in. If the interrupt information communicated by the central processing unit matches the state of the signature module with regard to the at least one first condition, then the signature module is intended to carry out a signature calculation and accordingly be "active". Otherwise, the signature module is inactive, i.e. no signature calculation is carried out. It should be noted that the at least one second condition mentioned can be, if appropriate, the complementary condition with respect to the at least one first condition.

The technical teaching disclosed can make it possible that, depending on a called/running interrupt routine, different configurations can be assigned to exception conditions ("exception", or "trap") of underlying hardware (processor) finely in respect of exception conditions. This can be e.g. special rights or else the activation/deactivation of specific hardware elements. The technical teaching disclosed thus constitutes an alternative to a general changeover for interrupt routines that applies to all interrupt routines in an identical manner. The technical teaching disclosed makes possible interrupt-fine hardware configurations. It is thus possible to obviate a complex software reconfiguration or to provide application scenarios which were otherwise not possible in this way or not possible so easily. The technical teaching disclosed utilizes an exception/interrupt identifier such as trap or interrupt level in order, depending on the latter, to select one of a plurality of hardware configurations. These configurations can either be fixedly predefined or else be software-programmable. The selected configuration then influences the interrupt routine to be processed.

The technical teaching disclosed can be utilized in order to implement with it an instruction flow signature including in processor systems with interrupt capability, without having to intervene in the architecture thereof such as stack management. For this purpose, the signature module can be assigned to a specific interrupt routine in a software-programmable manner. It is only if this routine is active that the signature calculation runs. It stops as soon as the routine is left or interrupted, and starts again as soon as there is a jump back to the routine. By changing the module assignment and management of the signature resources, a simple signature module thus becomes a module that is useable with full multithread capability. It should be noted here that the term interrupt routine does not rule out the basic task.

The substantive matter just explained can also be described in the following manner. In previous solutions, when an interrupt occurs, the signature is automatically put onto the stack (by the central processing unit). In accordance with the technical teaching disclosed, the calculation of the instruction signature can be activated in each case for only one or a plurality of specific interrupt number(s). When an interrupt occurs, generally a change in the current interrupt number occurs. It follows from this that when an interrupt occurs, the signature calculation is implicitly turned off (since the interrupt number of the central processing unit no longer matches the interrupt number of the signature module). Upon the return from the interrupt, a change (initiated by the central processing unit) to the original interrupt number can then take place and the calculation can thus be activated again. In contrast to an implementation that completely turns off the signature calculation in interrupts, a device and a method in accordance with the technical teaching disclosed can handle nested interrupts. This functions as follows: within an interrupt, it is possible firstly to save the current signature value in a local variable and it is subsequently possible to activate the signature calculation for the current interrupt number. At the end of the interrupt, it is then deactivated and the saved value is restored. This implementation can be interrupted at any point in time by a further interrupt, without signature problems occurring. If the switching-on/off did not take place implicitly on the basis of the interrupt number, but rather simply only by means of hard switching-on or -off, this would not be possible. The reason is that in the case of a nested interrupt the state of the previous interrupt cannot reliably be saved.

Furthermore, the situation is such that in the case of the interrupt it is typically not possible to restore the interrupted signature value or switch-on signal without implicit binding to the interrupt number (if e.g. the signature was switched on at the point in time of the interrupt, then it has to be activated again exactly upon the return. It is not permitted to be activated by the interrupt routine already beforehand as e.g. the last instruction of the interrupt).

Further exemplary embodiments of the technical teaching disclosed provide a signature module, which is designed to calculate a signature during the execution of a program by a central processing unit on the basis of program instructions to the central processing unit and to store the signature in a signature register of the signature module, wherein the signature module comprises a calculation unit, an interrupt information interface and an interrupt information evaluation unit. The calculation unit is designed for generating a signature value on the basis of program instructions executed on the central processing unit. The interrupt information interface is designed for receiving interrupt information from the central processing unit. The interrupt information evaluation unit is designed for determining an activity state of the calculation unit on the basis of the interrupt information, such that the calculation unit is active when at least one first condition of the interrupt information is met, in order, in the course of an interrupt routine being carried out, to calculate a signature based on program instructions of the interrupt routine and to store it in the signature register, and that the calculation unit is inactive when at least one second condition is met, and the signature register maintains a signature determined last by the calculation unit.

In accordance with further exemplary embodiments, the interrupt information can comprise an interrupt identifier indicating which interrupt is currently being executed on the central processing unit.

In accordance with further exemplary embodiments, the interrupt information evaluation unit can comprise an identifier register, in which a configured interrupt identifier can be stored, which indicates that the calculation unit is active for a current interrupt routine having a corresponding interrupt identifier. The identifier register can be configurable by means of program instructions, for example, such that in connection with a specific interrupt routine it is possible to decide whether a signature calculation is to be carried out for this interrupt routine. In this case, the interrupt routine can write its own interrupt identifier to the identifier register, i.e. correspondingly reconfigure the identifier register. The interrupt identifier is usually available at an interface of the central processing unit, such that no change in the central processing unit or processor is necessary in this regard.

In accordance with further exemplary embodiments, the interrupt information evaluation unit can comprise a comparator for comparing the interrupt identifier and the configured interrupt identifier.

In accordance with further exemplary embodiments, the identifier register can be configured to store a configured activity state of the calculation unit, which state is taken into account when determining an activity state of the calculation unit. Alternatively, the configured activity state can also be stored in a further memory element of the signature module. The configured activity state can be understood as a type of activity flag.

In accordance with further exemplary embodiments, the signature module can comprise a configuration interface for configuring the identifier register by means of a program instruction.

In accordance with alternative exemplary embodiments, the signature module is designed as before to calculate a signature during the execution of a program by a central processing unit on the basis of program instructions to the central processing unit and to store the signature in a signature register of the signature module. In this case, the signature module comprises a calculation unit for generating a signature value on the basis of program instructions executed on the central processing unit, and an instruction information interface for receiving at least one item of instruction information from the central processing unit which indicates whether an instruction currently being executed by the central processing unit was jumped to indirectly or directly. In principle, it is also possible to carry out signature updates at the entry point (that is to say at the destination point of the jump/function call). In order to afford increased security, the signature updating at this point can be made dependent on whether the point was jumped to directly or indirectly. It is thus possible to ensure that indirect entry destinations are actually only jumped to indirectly and direct entry destinations are actually only jumped to directly. The instruction information interface serves as (part of) a communication device between central processing unit and signature module which is used to communicate whether the instruction currently being executed in the central processing unit was jumped to indirectly or directly, or which communicates whether the following instruction is jumped to directly or indirectly. This information is taken up by the signature module in order to influence and/or additionally safeguard the signature calculation.

The signature module can furthermore be designed to take account of the information provided via the instruction information interface in the signature calculation.

With regard to a method, exemplary embodiments of the technical teaching disclosed provide a method for calculating a signature on the basis of instructions executed by a central processing unit during the execution of a program. The method is also provided for storing the signature in a signature register of a signature module, wherein calls of interrupt routines of subroutines can occur during the execution of the program by the central processing unit. The method comprises: reading out, if an interrupt request is received, the signature assigned to the interrupted program from the signature module by means of a program instruction of an interrupt routine assigned to the interrupt request; storing the signature by means of a program instruction of the interrupt routine; and writing the stored signature to the signature module by means of a program instruction of the interrupt routine before leaving the interrupt routine.

Alternatively or additionally, the method can comprise the following actions, if a call of a subroutine takes place: adapting the signature in the signature register to a signature of the subroutine by means of a program instruction that brings about a relative change in the signature, before the call of the subroutine, and adapting the signature in the signature register to a signature of a program section of the program from which the subroutine was called, by means of a further program instruction that brings about a relative change in the signature, after a return from the subroutine to the program section.

In accordance with exemplary embodiments, the method can furthermore comprise checking the signature during the execution of the called interrupt routine or the called subroutine.

In accordance with exemplary embodiments, the method can furthermore comprise: saving a state of the signature module for a routine that is being executed at the point in time of the call of the interrupt routine or of the subroutine, by means of a program instruction; and reestablishing, by means of a program instruction before leaving the interrupt routine or if the return from the subroutine takes place, the state of the signature module for the routine which is or was being executed at the point in time of the call of the interrupt routine or subroutine.

In accordance with exemplary embodiments, the method can furthermore comprise: activating a signature calculation for the interrupt routine or the subroutine.

In accordance with exemplary embodiments, if the return from the subroutine takes place, the signature can be updated by the corresponding program instruction for adapting the signature in such a way that, upon proper return from the subroutine to the program, the signature at a defined point of the program matches a reference signature of the program that is assigned to the defined point.

In accordance with further exemplary embodiments, after the return from the subroutine, the signature can be updated by the corresponding program instruction for the relative change in the signature in such a way that, upon proper returning from the subroutine to the program, the signature at a defined point of the program matches a reference signature value of the program assigned to the defined point.

In accordance with further exemplary embodiments, the return from the subroutine can be assigned an end reference signature value, which the signature in the signature register matches upon proper execution of the subroutine and which is also assigned to a return destination in the calling program section as reference signature value, wherein the signature in the signature register remains the same upon the return and is updated by the calling program section by means of a relative change in the signature in such a way that at a point in the calling program section a resulting signature value, upon proper execution, matches a second reference signature value assigned to the point in the calling program section.

The start reference signature value and/or the end reference signature value can be derived as a function of an address or of a name of the subroutine. Alternatively, the start reference signature value and/or the end reference signature value can be chosen randomly or are identical in each case for all functions.

In accordance with further exemplary embodiments, updating the signature in the context of the interrupt routine or the subroutine can be effected by means of a program instruction, such that, upon proper execution of the interrupt routine or of the subroutine, the signature at a defined point of the interrupt routine or of the subroutine matches a reference signature value assigned to the defined point of the interrupt routine or of the subroutine.

In accordance with further exemplary embodiments, the subroutine can be called in the form of an indirect function call, and the adaptation of the signature can comprise determining an update value on the basis of a unique identifier of the subroutine and modifying the signature by means of the update value.

The unique identifier of the indirectly called subroutine can be based on at least one of: a memory address of the subroutine; a name of the subroutine; a result of an assignment mapping for the identifier; an entry in an assignment table for the identifier; and a fixed constant, which is identical for all indirectly called functions.

Determining the update value can comprise the evaluation of at least one of an evaluation of an update value mapping and an evaluation of an update value table.

In accordance with further exemplary embodiments, the method can furthermore comprise: receiving interrupt information from the central processing unit via an interrupt information interface of the signature module; setting an activity state of the signature calculation, such that the signature calculation is active when at least one first condition is present, and that the signature calculation is inactive when at least one second condition is present; and, if the signature calculation is inactive, maintaining a signature determined last over a corresponding inactivity period.

In accordance with further exemplary embodiments, the method can furthermore comprise: evaluating an interrupt identifier indicating which interrupt is currently being executed on the central processing unit.

In accordance with further exemplary embodiments, the method can furthermore comprise: storing a configured interrupt identifier in an identifier register of an interrupt information evaluation unit, wherein the configured interrupt identifier indicates that the signature calculation is active for a current interrupt routine having a corresponding interrupt identifier.

In accordance with further exemplary embodiments, the method can furthermore comprise: comparing the interrupt identifier and the configured interrupt identifier in order to draw a conclusion about the activity state of the signature calculation from a result of the comparison.

In accordance with further exemplary embodiments, the method can furthermore comprise: storing a configured activity state of the signature calculation, the state being taken into account when determining the activity state of the signature calculation.

In accordance with further exemplary embodiments, the method can furthermore comprise: configuring an identifier register by means of a program instruction.

In accordance with further exemplary embodiments, the method can furthermore comprise: receiving an interrupt request and executing a corresponding context change before storing the signature assigned to the interrupted program.

Further exemplary embodiments of the technical teaching disclosed herein provide a computer program comprising a program code for carrying out the method defined above if the computer program runs on a computer.

Further exemplary embodiments of the technical teaching disclosed provide a method for creating the computer program mentioned above. The method for creating the computer program can be, for example, a method for compiling or translating a computer program into machine code from a source text. A further exemplary embodiment of the teaching disclosed relates to a corresponding compiler.

With regard to features associated with the call of the subroutine and/or the return from the subroutine, it is pointed out that formulations such as "if a call of a subroutine takes place" or "if the return from the subroutine takes place" should not necessarily be understood as a time indication, but rather express a general relationship between two events. Consequently, actions or events which are specified in greater detail by the formulations mentioned can also take place a few instructions before or after the call or return. If appropriate, the following statement can be used as a condition for a permissible removal of an action or event from the call or return: between the action or the event and the call or return or destination of the return in the calling function, the program should proceed linearly, i.e. comprise no branch points, junction points and/or optional paths.

BRIEF DESCRIPTION OF THE DRAWINGS

Exemplary embodiments of the present invention are described in greater detail below with reference to the accompanying figures, in which:

FIGS. 6A,6B show a schematic illustration similar to FIG. 5, but with two interrupt requests and two respectively associated returns;

DETAILED DESCRIPTION

Before exemplary embodiments are explained below with reference to the accompanying figures, it is pointed out that identical elements or elements having an identical function are provided with the same or similar reference symbols, and that a repeated description of these elements is dispensed with. Descriptions of elements having identical or similar reference symbols are therefore mutually interchangeable.

The technical teaching disclosed herein makes it possible that a complete entry/exit protection in subroutines exists and that instruction signatures in interrupts can be used, without hardware stacking having to be present for this purpose. The teaching is therefore suitable for providing existing processors, such as e.g. processors with ARM architecture, with an instruction mechanism without changing the architecture. In safeguarding the program flow by means of instruction signatures without using a hardware stack mechanism (i.e. without hardware stacking), in particular the safeguarding of subroutine calls, of indirect jumps and of interrupts are of relevance. The technical methods and devices for these critical points and for further measures which facilitate the integration of instruction signatures in standard processors are presented hereinafter.

Figure 1:
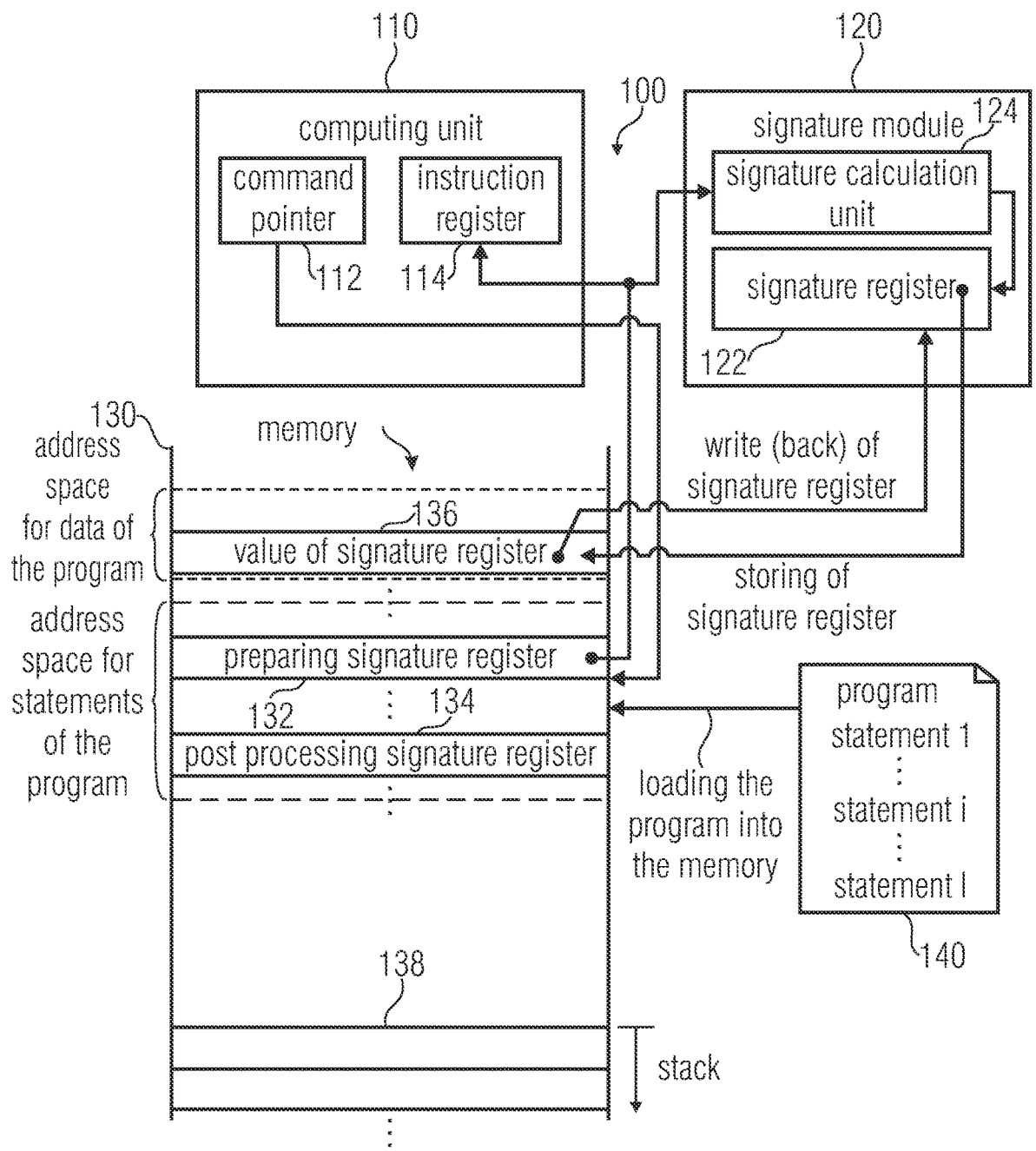
FIG. 1 shows a schematic block diagram of a device for executing a program comprising a central processing unit and a signature module.

FIG. 1 shows a schematic block diagram of a device 100 for executing a program 140. The device 100 comprises a central processing unit 110 and a signature module 120. The central processing unit 110 is operatively connected to a memory 130, in which both a program code having instructions to be executed and data to be processed by the program 140 are stored. However, such a use of the memory 140 is not necessary for the purposes of the technical teaching disclosed herein, and so the program code and the data to be processed could also be stored in different memories. By way of example, it is conceivable for the program code to be stored in a read-only memory (ROM), while the data to be processed are stored and can be stored in a random access memory (RAM).

For the purpose of executing the program 140 by means of the central processing unit 110, the program 140 is loaded into the memory 130. The program 140 comprises a multiplicity of program instructions ANW 1 to ANW I. The program instructions of the program 140 are loaded into an instruction address space of the program within the memory 130. The program 140 comprises instructions which serve for management or control of the signature calculation and are likewise loaded into the instruction address space of the program, to be precise at the memory locations 132 and 134 in the memory 130 in the example from FIG. 1. The instructions serving for management or control of the signature calculation will be discussed in even greater detail further below.

The memory 130 also comprises a data address space for the program 140. By way of example, local variables of the program which can be calculated and/or altered at the running time of the program are stored in the data address space. Accesses to local variables etc. of the program 140 are typically performed by the central processing unit 110 by means of write/read accesses to the memory 130. In addition, however, it is also possible for peripheral devices such as a printer or scanner, for example, to access the memory 130 directly.

If the program 140 has been loaded into the memory 130, the central processing unit 110 can read the instructions by memory accesses to the memory 130. For this purpose, the central processing unit 110 comprises an instruction pointer register 112, in which is stored an instruction pointer that points to an address in the instruction address space of the program 140 at which the next instruction to be executed by the central processing unit 110 is typically situated. The next instruction to be executed is loaded into an instruction register 114 by the central processing unit 110, in order that the central processing unit 110 can be controlled in such a way that the instruction procedures associated with the instruction can be executed in the manner envisaged. In this way, the central processing unit 110 processes data stored e.g. in the data address space of the program 140. The instruction pointer is incremented after the execution of the instruction procedure(s) associated with the instruction, in order to point to the subsequent instruction. It is also possible for a value determined by the program 140 for the instruction pointer to be loaded into the instruction pointer register 112, as a result of which branches and conditional jumps can be executed in the program sequence.

As a result of faults in the hardware or as a result of external influences, errors can occur during the processing of the program 140. By way of example, the memory 130, within the instruction data space for the program 140, can have a defect (e.g. a memory cell having a stuck-at fault, such that the associated bit permanently has a logic value "0" or "1"). Such a fault can also be deliberately provoked by irradiating the memory chip e.g. using a laser. A fault can also occur on the connection between the memory 130 and the central processing unit 110, the connection often being provided by a bus.

If the central processing unit 110 receives an erroneous instruction on account of such a fault, the program 140 is no longer executed in the manner intended by a compiler. In order to detect erroneous instructions, the device 100 comprises the signature module 120. The signature module 120 is connected to the connection between the memory 130 and the central processing unit 110, typically as close as possible to the central processing unit 110, in order that the signature module 120 with high probability receives the same data as the central processing unit 110. As an alternative to the configuration illustrated in FIG. 1, it is also conceivable that the signature module 120, via an interface of the central processing unit 110, has access to the instruction register 114 and can thus read the instruction register 114.

The signature module 120 comprises a signature register 122 and a signature calculation unit 124. Upon each new instruction communicated from the memory 130 to the central processing unit 110, this instruction is concomitantly read by the signature calculation unit 124 and a new signature value is calculated in accordance with a signature calculation specification, the new signature value being stored in the signature register 122. The signature calculation specification typically also incorporates a current value of the signature which was stored until then in the signature register 122. The signature calculation specification can comprise e.g. an XOR logic operation and/or a polynomial division. After each new instruction to the central processing unit 110, the signature stored in the signature register 122 has a value resulting from the previous instructions to the central processing unit and from the current instruction to the central processing unit. This value can already be calculated beforehand by the compiler and stored in the program 140. The program 140 can contain instructions by which the value determined by the compiler is compared with the value calculated at the running time of the program 140 and stored in the signature register 122. Upon both values matching, it can be assumed with high probability that the program 140 has been executed in the manner that was intended by the compiler at the compiling time. Otherwise, a fault was presumably detected and the program 140 can react to this in an appropriate manner, e.g. by ending the program execution, outputting a corresponding error message, etc.

During the execution of the program 140 it can happen that subprograms or subroutines are called which were not compiled jointly with the main program. Consequently, the compiler typically cannot include the subprogram or subroutine in the signature calculation when compiling the main program. A dedicated signature calculation can be provided for the subprogram or subroutine. The call of the subprogram/subroutine and the return from the subprogram/subroutine are then not protected, however, in the context of the signature calculation. In order that a dedicated checksum can be calculated for the subprogram or subroutine, it would typically be necessary for the signature register 122 of the signature module 120 to be saved or respectively restored in connection with the change to/from the subprogram. This would typically be affected by means of a hardware stack mechanism in which the central processing unit automatically saves the signature register 122 on a stack 138 in the event of a subroutine call and restores it again from the stack upon the return. In FIG. 1, the stack 138 is illustrated as part of the memory 130, but could also be implemented as a dedicated memory structure or be part of some other memory. The management of the stack is generally a task of the central processing unit 110. Consequently, the term hardware stack mechanism is understood herein such that the hardware itself puts something onto the stack or retrieves it from the stack—without explicit program instructions being present for this purpose. In previous solutions, the central processing unit 110 is designed for saving and restoring the signature register 122 of the signature module 120, which, under certain circumstances, necessitates corresponding precautions within the central processing unit 110.

Besides the call of subprograms and/or subroutines, many computer systems also support interrupts in the execution of a program, in order to execute a different program in the meantime. In this case, too, in previous solutions, if the signature calculation during the processing of the interrupt was not deactivated generally for all interrupts, hardware stack mechanisms performed by the central processing unit 110 are used.

FIG. 1 illustrates some aspects of a possibility of managing without hardware stack mechanisms for the purposes of the signature calculation. The program 140 comprises program instructions with which the signature module 120 can be controlled and can be configured in the case of subprogram calls, subroutine calls and/or interrupts for a signature calculation in connection with the subprogram, subroutine or interrupt routine. The stack is then not filled with states of the signature module in an automated manner by the central processing unit 110, rather this takes place explicitly by means of corresponding program instructions.

As an example, FIG. 1 illustrates two instructions 132 and 134 stored in the instruction address space of the program 140. The instruction 132 concerns a preprocessing of the signature register 122 and the instruction 134 concerns a post processing of the signature register 122, wherein the pre- and post-processing relate to a context change such as occurs e.g. upon the call of a subprogram, a subroutine and/or an interrupt routine.

If the instruction pointer of the central processing unit 110 reaches the instruction 132, the instruction procedure associated with the instruction 132 is executed by the central processing unit 110. The instruction procedure can concern e.g. the storage of the value of the signature register 122 in a local variable of the program 140. The local variable can be stored at a memory location 136 in the data address space of the program. By way of example, at the beginning of an interrupt routine, it is possible in this way to save the signature of the program which was being executed at the point in time of the interrupt. Toward the end of the interrupt routine, the previously saved signature can be written back to the signature register 122 again, which is instigated by the program instruction 134. Starting from the point in time of writing back the signature, the interrupt routine will typically no longer alter the signature register 122, that is to say that either the signature calculation has already been deactivated at this point in time or the writing back of the signature takes place shortly before the return from the interrupt routine. The program 140 is typically the interrupt routine.

In the case of a subprogram or subroutine, the preprocessing can consist in updating or adapting the signature in the signature register 122 in such a way that, during the execution of the subprogram/subroutine, it matches reference signatures stored for specific points in the subprogram or subroutine in the code (provided that until then no error which is intended to be detected by the signature module 120 has occurred in the program execution). The same correspondingly applies to the post-processing of the signature register 122 and the return from the subprogram or subroutine: independently of what subprogram or subroutine was executed, and independently of what sequential path within the subprogram was traversed, the program-controlled post-processing of the signature register 122 can ensure that at a point after the return from the subprogram or subroutine the signature in a function which called the subprogram or the subroutine again matches a reference signature value stored for the point (provided that until then no error which is intended to be detected by the signature module 120 has occurred in the program execution).

Figure 2:
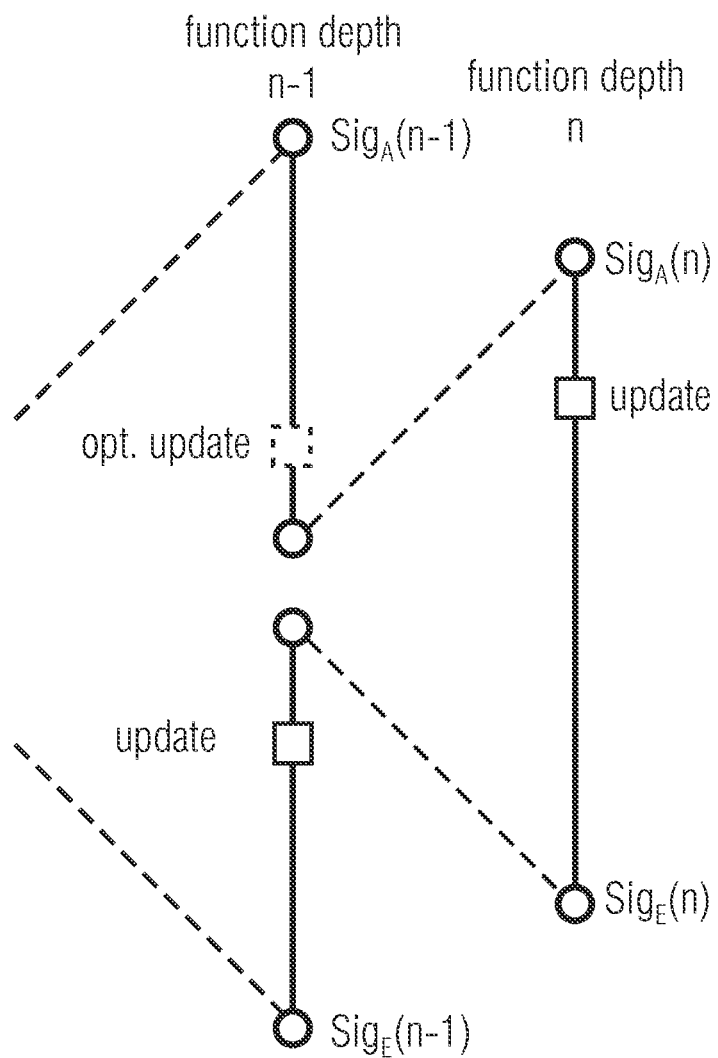
FIG. 2 shows a schematic illustration of a direct subroutine call.

FIG. 2 shows a schematic function call diagram illustrating some aspects of the technical teaching disclosed herein for direct function calls. Direct function calls are function calls whose destination address is already fixed during compiling. In order to safeguard the entry and exit in the case of direct function calls, for each function a start signature $SIG_A$ and an end signature $SIG_E$ are generated during the compiling of the program or during the creation of the binary program code. There are three variants for generating these signatures: the values can be generated randomly for each function, derived from the address of the respective function or be identical for all functions (the latter variant affords only limited entry/exit protection). Independently of how the values are selected, the program flow is then safeguarded in the manner outlined in FIG. 2.

In the calling function (caller), the start signature $SIG_A(n-1)$ is chosen such that upon entry into the function n, the value of the instruction signature corresponds exactly to $SIG_A(n)$. Alternatively, in the case of a predefined value $SIG_A(n-1)$, an updating of the signature is carried out before entry, such that upon entry into the function n, the value of the instruction signature corresponds exactly to $SIG_A(n)$. In the function n, by means of an adaption or update (at any desired position before the first branch in the function), the signature is corrected in such a way that, upon reaching the end of the function (and upon proper execution of the function), the value of the instruction signature is exactly $SIG_E(n)$. In the calling function, after the return, an update of the signature is carried out analogously, such that the value $SIG_E(n-1)$ is attained at the end of the function.

Figure 3:
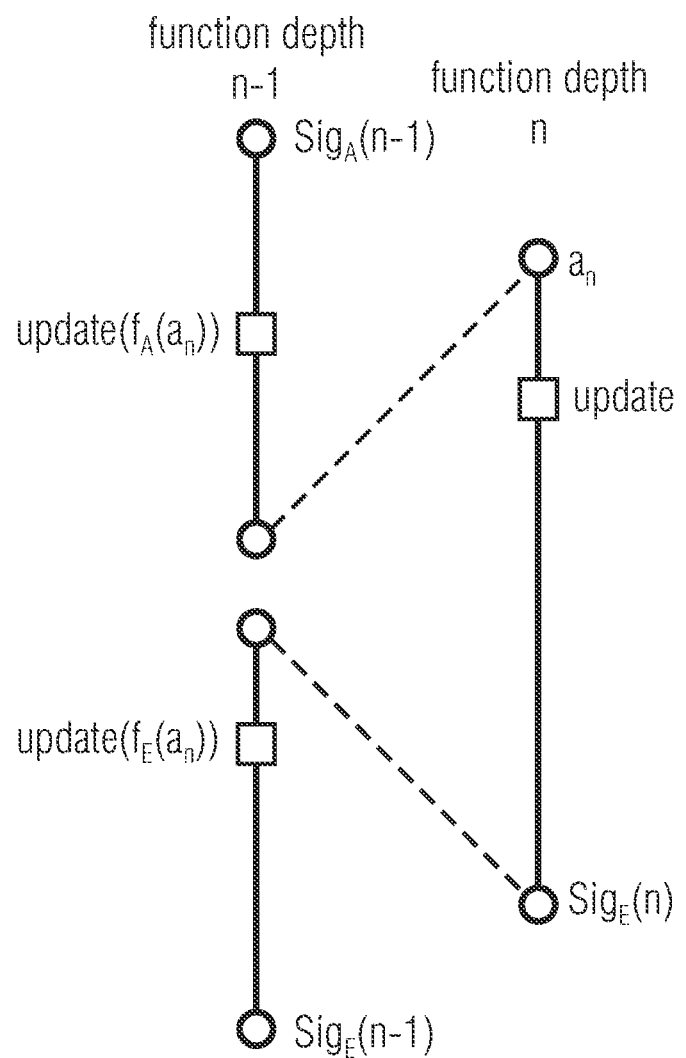
FIG. 3 shows a schematic illustration of an indirect subroutine call.

FIG. 3 shows a schematic function call diagram illustrating some aspects of the technical teaching disclosed herein for indirect function calls. For safeguarding indirect functions in accordance with the technical teaching disclosed, it is proposed that $SIG_A$ and $SIG_E$ are derived from a function identification number of the function to be protected (this can be e.g. the address $a_n$—as in the case of direct function calls in FIG. 2). The basic concept of the safeguarding consists in the fact that before and after the call of the subroutine, update values are calculated on the basis of the function identification number and applied in such a way that start signature and end signature of the calling function and of the called function are calculated correctly (provided that no physical attack, hardware fault, etc. has occurred). For the calculation of the update value of the start signature, a mapping $f_A$ is used, which incorporates the function identification number as the argument, that is to say $f_A(a_n)$.

The mapping $f_A(a_n)$ can be evaluated as soon as it is established what function is intended to be called by means of an indirect function call, that is to say the function identification number is established.

For the calculation of the update value of the end signature, a further mapping $f_E$ is used, which likewise incorporates the function identification number $a_n$ as the argument, that is to say $f_A(a_n)$. The update of the end signature $Sig_E(n)$ is carried out after the return to the calling function. Since the end signature $Sig_E(n)$ of the subroutine is known, an appropriate update value $f_E(a_n)$ can be calculated with the aid of the function identification number $a_n$, such that the signature within the calling function at a point after the update corresponds to a reference signature allocated to this point, provided the program has been carried out properly. Since the update values are calculated on the basis of the function identification number at the running time, after the latter has been determined, function calls which are not known at the compiling time, but rather only arise at the running time, can thus also be safeguarded by means of instruction signature monitoring.

Indirect jumps can be protected analogously to indirect function calls. For the indirect jump, an appropriate update value is calculated on the basis of the destination address.

Figure 4:
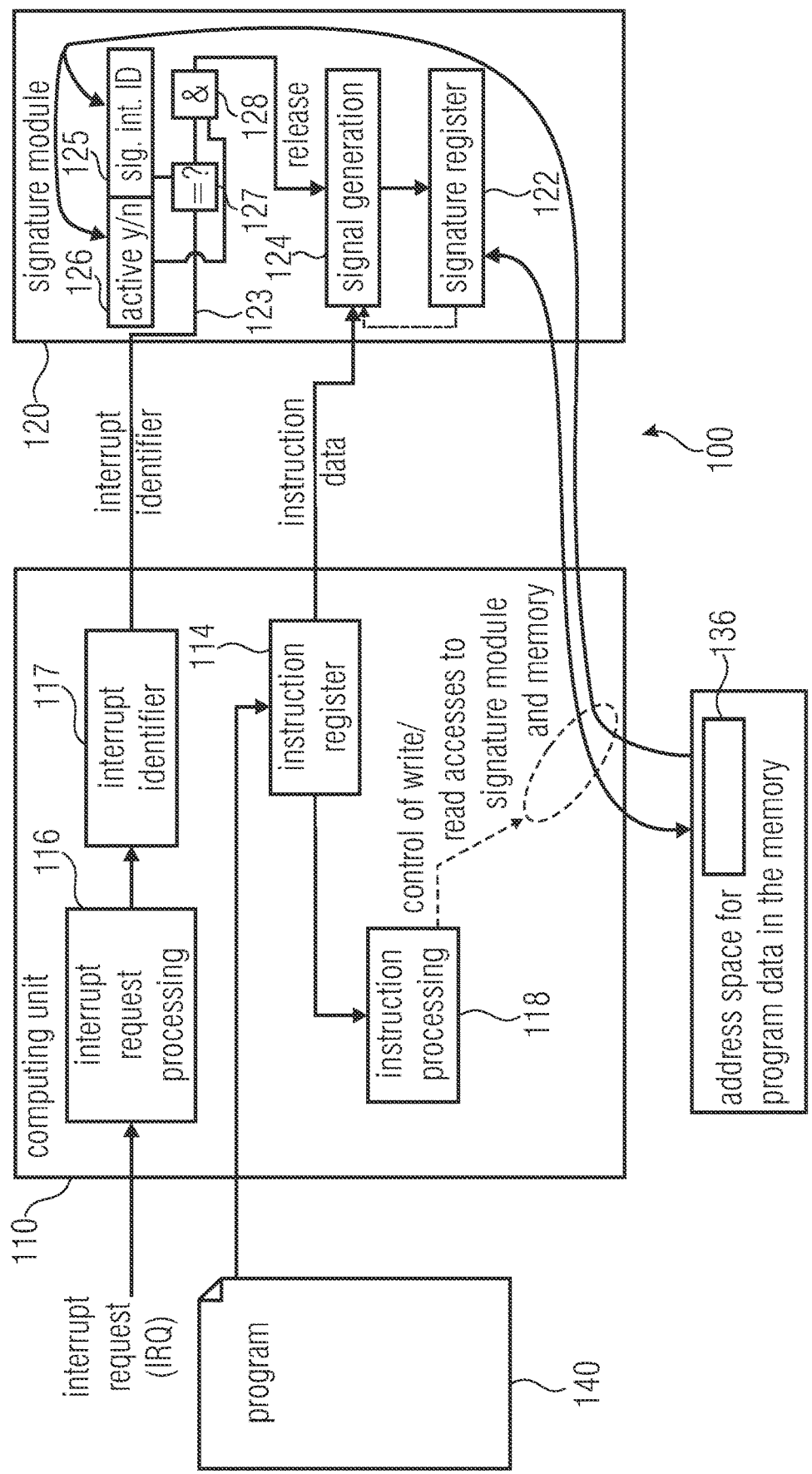
FIG. 4 shows a schematic block diagram of a device for executing a program in accordance with a further exemplary embodiment.

FIG. 4 shows a block diagram of a device 100 in accordance with a further exemplary embodiment of the technical teaching disclosed. The device 100 shown in FIG. 4 is designed to enable a signature calculation within a corresponding interrupt routine in the case of interrupt requests, no hardware stack mechanism being required for the signature.

Alongside components already explained in connection with FIG. 1, the central processing unit 110 comprises an interrupt request processor 116, a register 117 for an interrupt identifier and an instruction processor 118.

The signature module 120 comprises an interrupt information interface 123 and an interrupt information evaluation unit comprising a plurality of subcomponents. In particular, the interrupt information evaluation unit comprises an identifier register 125, a memory unit 126 for an activity state of the calculation unit 124 of the signature module 120, a comparator 127 and a logic gate 128.

Upon reception of an interrupt request by the central processing unit 110, the request is fed to the interrupt request processor 116. The interrupt request processor 116 can identify the interrupt request and provide the interrupt identifier, which is stored in the register 117 for the interrupt identifier. Via an interface provided by the central processing unit 110, the interrupt identifier can be made available to peripheral devices and other assemblies of a computer system. In this way, the signature module 120 can also evaluate the interrupt identifier.

The signature module 120 receives the interrupt identifier via the interrupt information interface 123 and forwards it to the comparator 127. The comparator 127 is designed to compare the current interrupt identifier with the content of the identifier register 125. If the two values match, then this means that the signature module 120 is currently configured for the current interrupt routine. The output of the comparator 127 is connected to an input of a logic AND gate 128. The other input of the logic AND gate 128 is connected to the memory unit 126 for the activity state of the calculation unit 124. An enable signal for the calculation unit 124 is output at the output of the logic gate 128. It follows from the interplay of comparator 127 and logic gate 128 that the enable signal for the calculation unit 124 has the value "1" or "true" if the current interrupt identifier matches the content of the identifier register 125 and the activity state of the calculation unit 124 has the logic value "true". Consequently, a signature calculation by the calculation unit 124 is effected under these conditions. Otherwise, the signature is maintained in the signature register 122. The identifier register 125 makes it possible for the signature module 120 to be active for selected interrupt routines, and in contrast inactive for other interrupt routines.

In the event of a context change of the central processing unit 110, such as an interrupt request or a function call, the device 100 is able, inter alia, also to save a state of the signature module 120 and to restore it again at a later point in time. The program 140 can contain instructions which cause the central processing unit 110 and the instruction processor 118 thereof to access one of the registers of the signature module 120 in order to carry out a write access or a read access there. The central processing unit 110 can therefore access the identifier register 125 and/or the signature register in a program-controlled manner.

An access to the identifier register 125 is typically a write access and serves to configure the signature module 120 for an interrupt routine (if appropriate just called), such that, in the context of this interrupt routine, a signature calculation can be carried out without disturbing or corrupting a previously carried out signature calculation of a different (interrupt) routine. In this case, the interrupt identifier is written to the register 125. The program 130 can determine this value e.g. by evaluation of the register 117 of the central processing unit 110. This is illustrated in FIG. 4 by an arrow from the data address space of the program to the interrupt information evaluation unit 125, 126 of the signature module 120.

An access to the signature register 122 can be a read or a write access and serve for saving or restoring the signature. The saving or restoring is in turn affected in a program-controlled or program-instigated manner. Accordingly, in the case of signature saving the program 130 instructs the central processing unit 110 to read the value stored in the signature register 122 and to write it in a local variable in the data address space of the program 130, to put it more precisely to the memory address designated by the reference symbol 136. In the case of restoring, the local variable is read and the value is written to the signature register 122. This is identified in FIG. 4 by a double-headed arrow that schematically connects the signature register 122 to the data address space of the program.

A signature module similar to the signature module shown in FIG. 4 can comprise an instruction information interface instead of or in addition to the interrupt information interface. Via the instruction information interface, the signature module can receive information from the central processing unit about whether the current instruction was jumped to directly or indirectly. By means of this additional information, the signature module can influence and/or additionally safeguard the signature calculation. The information provided via the instruction information interface can thus be taken into account in the signature calculation.

Figure 5:
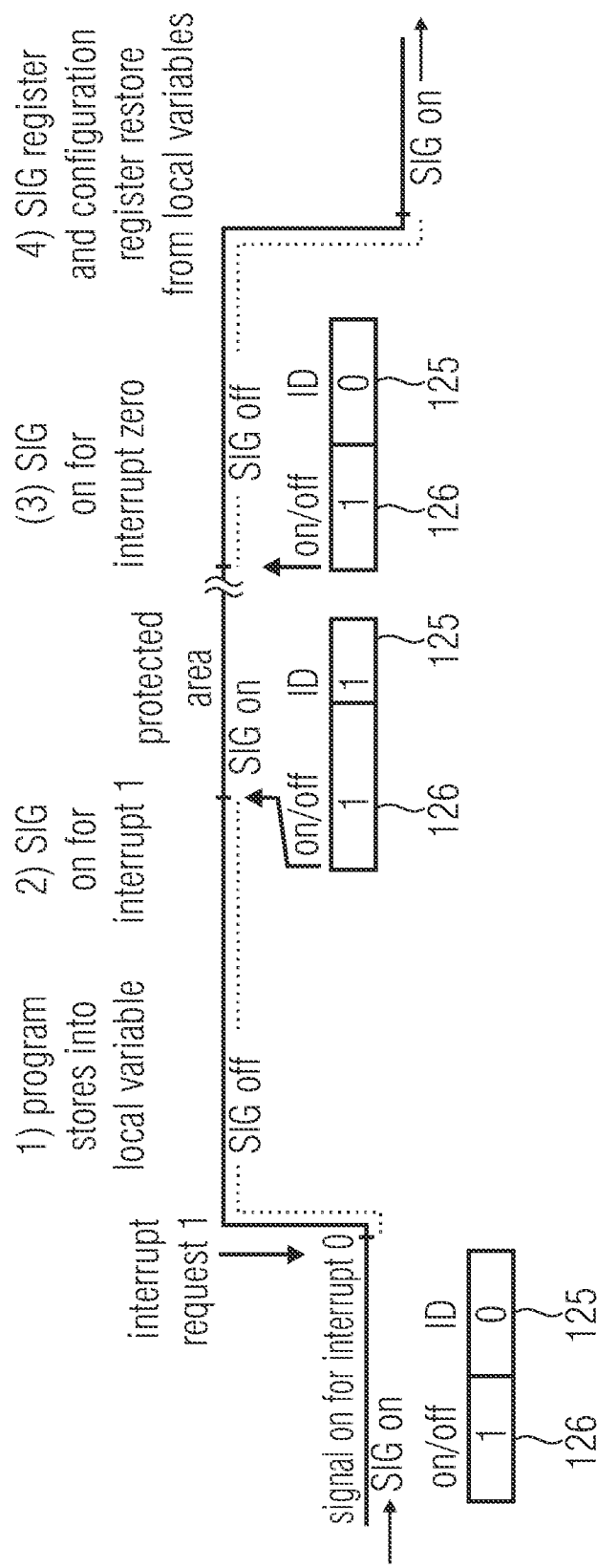
FIG. 5 shows a schematic illustration of an interrupt request and an associated return.

FIG. 5 schematically illustrates the processes during an interrupt request and a corresponding return after the processing of the interrupt request. By way of example, a device 100 as illustrated in FIG. 4 can be used in this case.

The device 100 is firstly in a state in which an interrupt routine for an interrupt 0 is processed. The signature calculation for the interrupt routine 0 is active. The identifier register 125 and the assigned memory unit 126 for the configured activity state of the calculation unit 124 are illustrated in FIG. 5 and contain the value 0 for the configured interrupt identifier and the value 1 for the activity state.

During the processing of the interrupt routine 0, an interrupt request is received for an interrupt 1. The central processing unit carries out a context change in order to execute the interrupt routine 1. Since, in connection with the context change, the number of the current interrupt also changes and therefore no longer matches the configured identifier in the identifier register 125, the signature calculation is switched off or inactivated (dotted line in FIG. 5).

The central processing unit 110 then begins to execute the interrupt routine 1. As the first instruction 1), a saving of the signature register 122 is carried out. A second instruction 2) activates the signature calculation for the interrupt routine 1. This comprises reconfiguring the identifier register 125 of the signature module 120. After the second instruction 2), there is thus a "1" for the interrupt routine 1 in the identifier register 125.

In a program section of the interrupt routine 1 that is designated as a "protected area", the actual instructions or instruction procedures for which the interrupt routine is provided can now be carried out.

After the processing of the instructions in the protected area, the interrupt routine 1 makes preparations for the imminent return to the interrupt routine 0.

For this purpose, on account of a program instruction 3), a "0" is written to the identifier register 125 again. Since the central processing unit 110 is still in the interrupt routine 1, a signature calculation is now no longer carried out.

By means of a program instruction 4), the signature register 122 and, if appropriate, a configuration register of the signature module are reestablished. The interrupt routine 1 is thus ended and the central processing unit 110 changes back again to the interrupt routine 0. As soon as the central processing unit 110 has performed the context change and entered the current interrupt identifier "0" in the register 117, the signature calculation is switched on again.

Figure 6B:
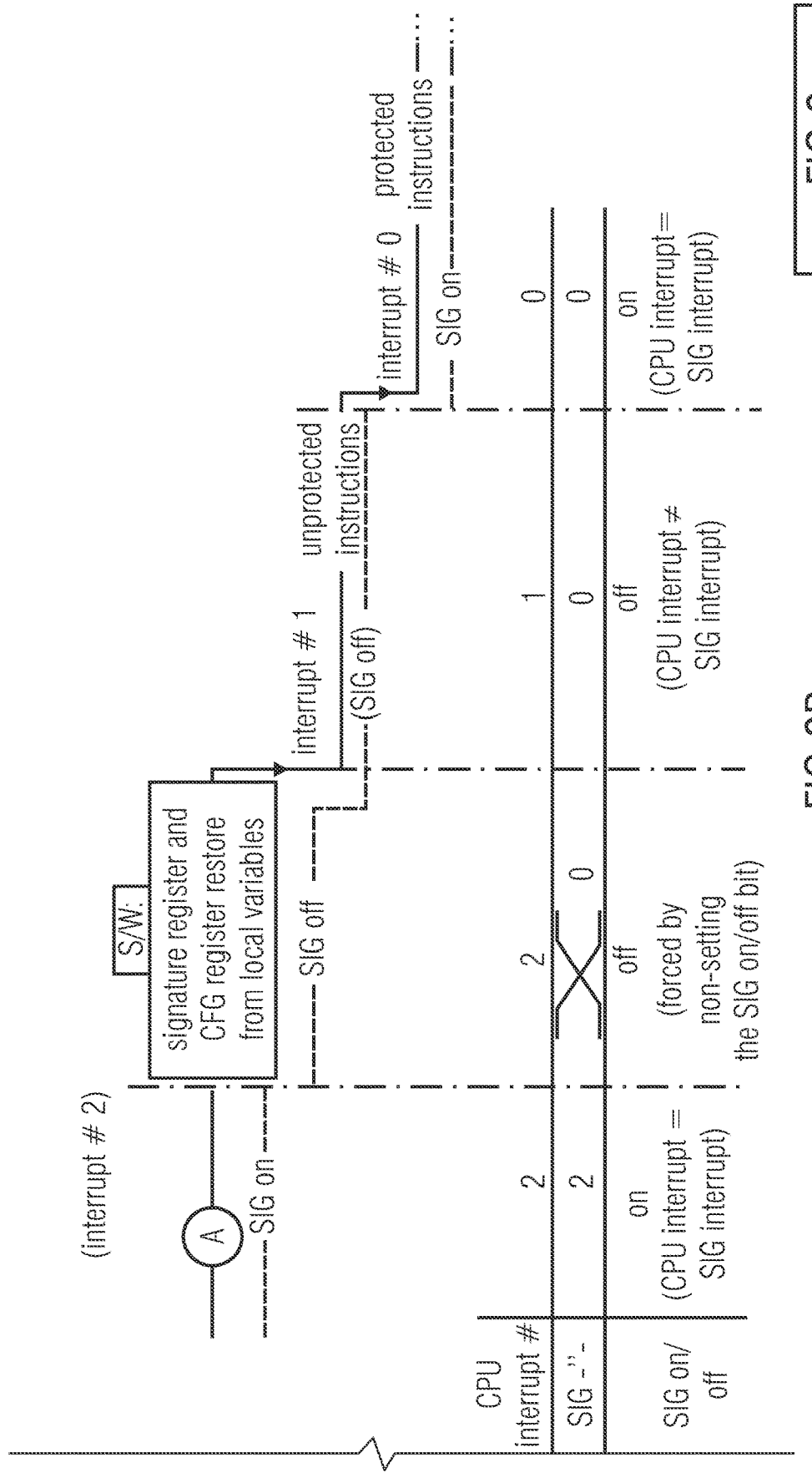

FIGS. 6A and 6B show a similar scheme to FIG. 5, but for a case in which three interrupt routines 0, 1 and 2 are involved. A signature calculation is intended to be carried out in each case for the interrupt routines 0 and 2. By contrast, no signature calculation is intended to be carried out for the intervening interrupt routine 1. This was decided in this way e.g. by the responsible program developer.

Upon the change from the interrupt 0 to the interrupt 1, the central processing unit 110 (also designated by CPU in FIGS. 6A and 6B) changes the content of the register 117 as usual, in order to point out the currently processed interrupt routine or to remember the latter. Since the signature module 120 is still configured for the interrupt routine 0, no signature calculation is carried out during the execution of the interrupt routine 1, which corresponds to the decision of the program developer.

Upon the change from the interrupt 1 to the interrupt 2, the interrupt routine 2 reconfigures the signature module 120, such that a signature calculation is carried out for the interrupt routine 2 (instruction "SIG on for Intrpt #2" in FIG. 5). Beforehand the content of the signature register 122 was also saved, which still contains the value of the signature such as existed for the interrupt routine 0 at the point in time of the interrupt request 1.

Within the interrupt routine 2 there is a protected area in which the actual instructions of the interrupt routine 2 can be executed and in which the signature calculation for the interrupt routine 2 is active.

At the end of the interrupt routine 2, by means of a program instruction of the interrupt routine 2, it is ensured that the signature register 122 and the configuration register 125, 126 are restored again from local variables. The signature module 120 is now configured again in the manner provided for the signature calculation in the interrupt routine 0.

After the return from the interrupt routine 2 to the interrupt routine 1, no signature calculation is carried out since the interrupt identifier of the central processing unit 110 (register 117) does not match the configured identifier of the signature module 120.

By contrast, after the return to the interrupt routine 0, the signature calculation is continued with the values that were stored at the point in time of the interrupt request 1 in the signature module 120.

The lower section of FIGS. 6A and 6B shows a table illustrating how the register contents and states of the central processing unit 110 and of the signature module 120 change over time. The interrupt identifier for the central processing unit 110 ("CPU Intpt#") changes substantially synchronously with the context changes executed by the central processing unit 110. The configured identifier "SIG Intpt#" is changed by means of targeted program instructions. This occurs within the interrupt routine 2 in the context of the program instruction "SIG on for Intpt #2" and toward the end of the interrupt routine 2 by means of the program instruction "restore SIG register and CFG register from local variables".

The activity state "SIG on/off" of the signature module 120 is represented in the bottommost line and results from a logic combination of the two lines thereabove. The illustration in FIGS. 6A and 6B does not show the configured activity state of the signature module as stored in the memory element 126, rather it was assumed here for simplification that the activity state is always "active".

Figure 7A:
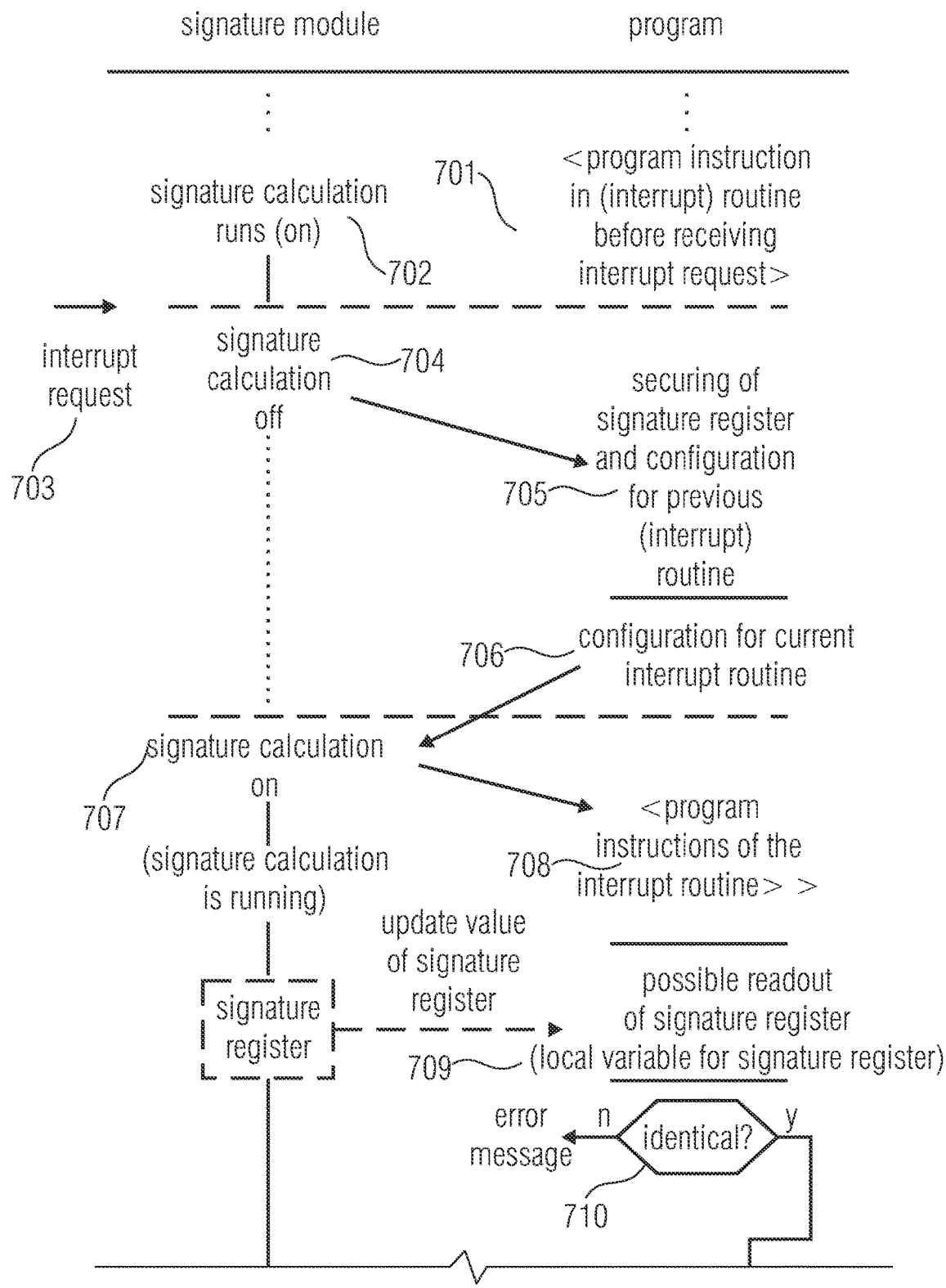
FIGS. 7A, 7B show a schematic flowchart for processing an interrupt request and associated actions for signature calculation.
Figure 7B:
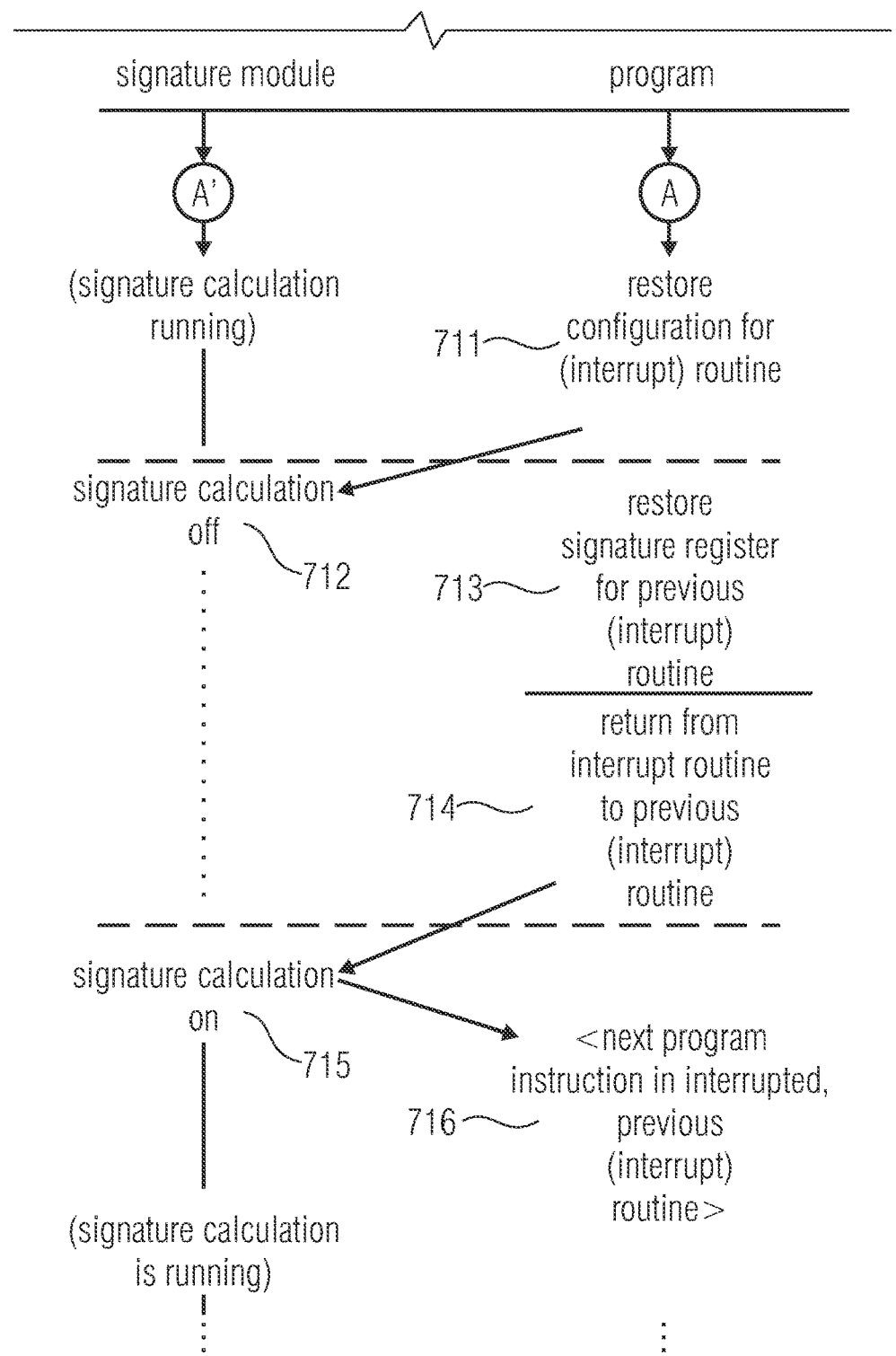
Figure 7:
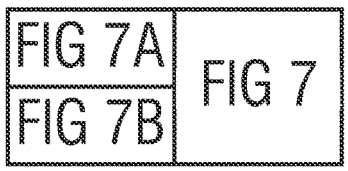

FIGS. 7A and 7B show a hybrid form of a flowchart and a communication diagram revealing the interaction between the signature module 120 and a program 140 in the case of interrupt requests.

Before the interrupt request is received, program instructions of a routine are executed initially, as illustrated at 701. If appropriate, the signature module 120 carries out a corresponding signature calculation, as indicated by the reference symbol 702.

703 designates an interrupt request which was received by the central processing unit 110 and which causes the central processing unit 110 to change to the corresponding interrupt routine. Owing to the change to the new interrupt routine, the signature calculation is stopped (reference symbol 704).

Since a signature calculation is intended to be effected within the new interrupt routine, a program instruction 705 ensures that the signature register 122 and the configuration register 125, 126 of the signature module 120 are saved in one or more local variables of the new interrupt routine. A second program instruction 706 configures the signature module 120 for a signature calculation within the new interrupt routine.

On account of the reconfiguration of the signature module 120, the signature calculation is activated again at 707. The subsequent program instructions 708 of the interrupt routine are thus monitored by the signature module 120.

Optionally, a check of the signature can be carried out during the interrupt routine. For this purpose, the signature register 122 is read by means of a program instruction 709. At 710, the value read out is compared with a reference signature that was written into the code of the interrupt routine by a compiler of the interrupt routine. If a deviation is ascertained, e.g. an error message can be output and the interrupt routine can be ended. By contrast, if the values are identical, the method is continued in FIG. 7B, as indicated by the linkings A and A'.

At 711, the configuration of the signature module 120 for the old routine is restored again. At 712, this has the effect that the signature calculation is halted. By means of a program instruction 713, the signature register 122 is then also restored again with the value that was in the signature register at the point in time when the interrupt request 703 was received. By means of a specific program instruction 714, the central processing unit returns from the interrupt routine to the previous routine. The specific program instruction 714 can be e.g. an RET instruction.

After the return to the previous routine, the signature calculation is implicitly switched on again at 715, since the interrupt identifiers match. The previous, interrupted routine is continued with the next program instruction 716 present. The processing of the interrupt request 703 including signature calculation is thus concluded.

Figure 8:
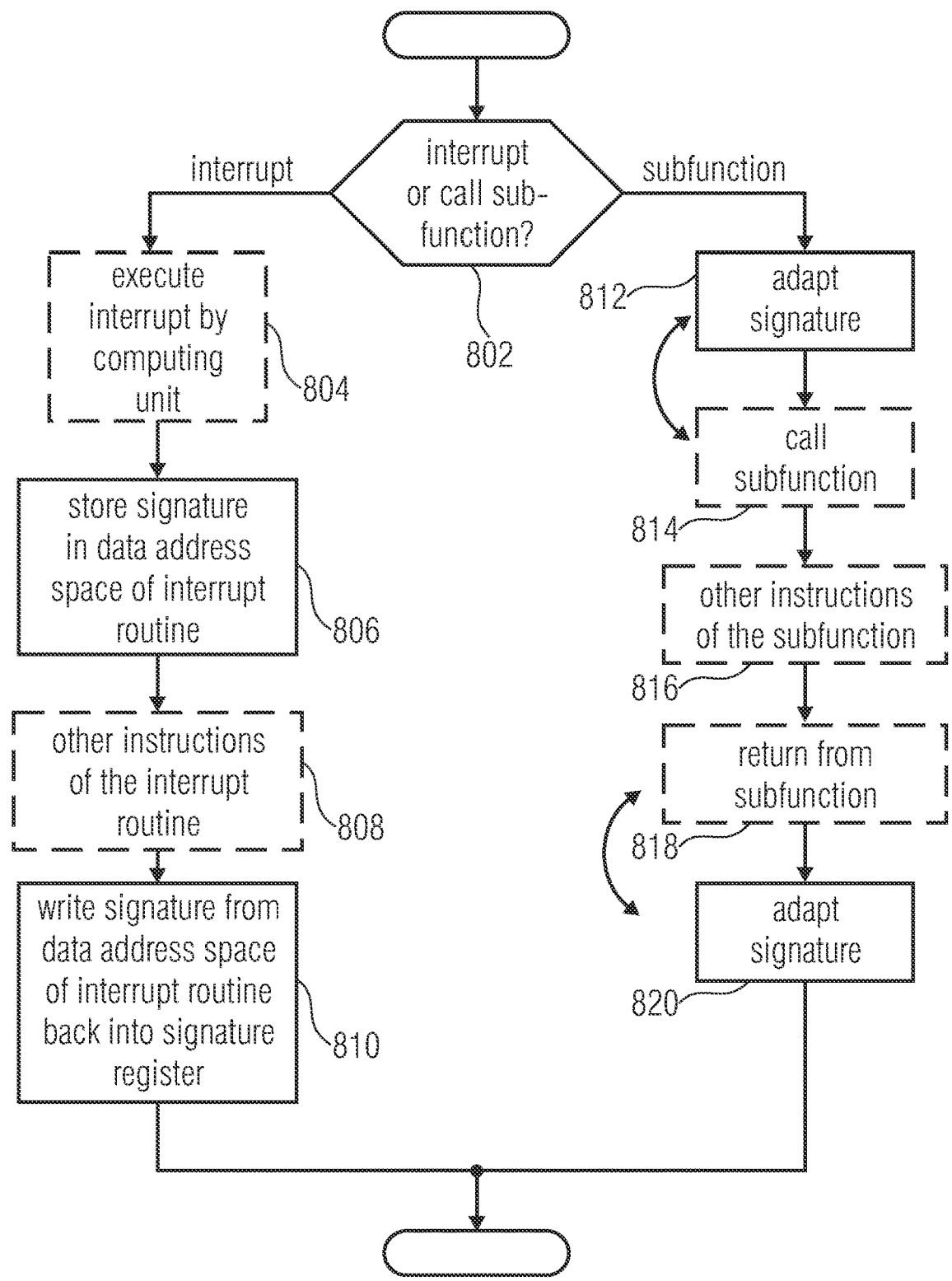
FIG. 8 shows a schematic flowchart for a method for calculating a signature in accordance with an exemplary embodiment.

FIG. 8 shows a schematic flowchart of a method for calculating a signature on the basis of instructions executed by a central processing unit during the execution of a program.

At a branch 802, firstly a distinction is made between an interrupt request (INTERR.) and a call of a subroutine. If an interrupt request is involved, the actions 804 to 810 are executed, some of which are optional, however.

In the case of the interrupt request, the central processing unit 110 carries out a context change at 804.

In the course of the interrupt routine that was started on account of the context change, at 806 the signature is then stored in a data address space of the interrupt routine.

Optionally, at 808 other instructions are carried out, which are defined in the interrupt routine. These other instructions typically serve to fulfill the purpose intended by the interrupt routine (e.g. fetching data from a peripheral device such as a computer keyboard).

In order to conclude the interrupt routine, the signature stored at 806 is written back to the signature register 122 again, as shown by the action 810.

If a subroutine call is present at the branch 802, the branch 802 is followed by the action 812, in which the signature stored in the signature register 122 is adapted. At 814 the subroutine is then called by the central processing unit 110. The actions 812 and 814 are interchangeable in their order.

Optionally, at 816 other instructions are carried out, which are defined in the subroutine. These other instructions typically serve to fulfill the purpose intended by the subroutine (e.g. carrying out a specific calculation).

The return from the subroutine takes place at 818, and at 820 the signature in the signature register is once again adapted. Here, too, the actions 818 and 820 are reversible in their order.

After the actions 810 and 820 in the two different paths, the method unites again and then ends.

The technical teaching disclosed also relates to an instruction flow supervision device for a program which is executed on a programmable device, wherein the instruction flow supervision device is configured to execute the following operations: execution of a program instruction for configuring an instruction signature; execution of at least one instruction defined by the program by the programmable device; processing of the at least one instruction defined by the program by an instruction flow supervision device, wherein the at least one instruction defined by the program modifies the instruction flow signature; and execution of a further program instruction for restoring the instruction signature.

The technical teaching disclosed furthermore relates to an instruction flow supervision device for a program which is executed on a programmable device, the instruction flow supervision device comprising: a check value generating unit for generating a check value on the basis of instruction identifiers of instructions which are executed on the programmable device; a check value memory for storing the check value; an interrupt information interface for receiving interrupt information from an instruction processing unit of the programmable device; and an interrupt information evaluation unit for setting an activity state of the check value generating unit, such that the check value generating unit is active when at least one first condition of the interrupt information is present, and that the check value generating unit is inactive when at least one second condition is present, and the check value memory maintains a check value determined last by the check value generating unit.

The technical teaching disclosed also relates to a method for the instruction flow supervision of a program which is executed on a programmable device, the method comprising: executing a program instruction for configuring an instruction signature; executing at least one instruction defined by the program by means of the programmable device; processing the at least one instruction defined by the program by means of an instruction flow supervision device, wherein the at least one instruction defined by the program modifies the instruction flow signature; and executing a further program instruction for restoring the instruction signature.

The technical teaching disclosed also relates to a method for the instruction flow supervision of a program which is executed on a programmable device, the method comprising: generating a check value on the basis of instruction identifiers of instructions which are executed on the programmable device; storing the check value; receiving interrupt information from the programmable device; and setting an activity state of the generation of the check value, such that the generation of the check value is active when at least one first condition of the interrupt information is present, and that the generation of the check value is inactive when at least one second condition is present, and a check value determined last is maintained.

Although some aspects have been described in connection with a device, it goes without saying that these aspects also represent a description of the corresponding method, such that a block or a component of a device should also be understood as a corresponding method step or as a feature of a method step. Analogously to this, aspects which have been described in connection with a or as a method step also represent a description of a corresponding block or detail or feature of a corresponding device. Some or all of the method steps can be performed by a hardware apparatus (or using a hardware apparatus), such as, for example, a microprocessor, a programmable computer or an electronic circuit. In some exemplary embodiments, some or a plurality of the most important method steps can be performed by such an apparatus.

Depending on the specific implementation requirements, exemplary embodiments of the invention can be implemented in hardware or in software. The implementation can be effected using a digital storage medium, for example a floppy disk, a DVD, a Blu-ray disk, a CD, a ROM, a PROM, an EPROM, an EEPROM or a flash memory, a hard disk or some other magnetic or optical storage device on which electronically readable control signals are stored which can interact or do interact with a programmable computer system in such a way that the respective method is carried out. Therefore, the digital storage medium can be computer-readable.

Some exemplary embodiments according to the invention therefore comprise a data carrier having electronically readable control signals which are able to interact with a programmable computer system in such a way that one of the methods described herein is carried out.

Generally, exemplary embodiments of the present invention can be implemented as a computer program product comprising a program code, wherein the program code is effective for carrying out one of the methods if the computer program product runs on a computer.

The program code can also be stored on a machine-readable carrier, for example.

Other exemplary embodiments comprise the computer program for carrying out one of the methods described herein, wherein the computer program is stored on a machine-readable carrier.

In other words, one exemplary embodiment of the method according to the invention is therefore a computer program comprising a program code for carrying out one of the methods described herein if the computer program runs on a computer.

A further exemplary embodiment of the methods according to the invention is therefore a data carrier (or a digital storage medium or a computer-readable medium) on which the computer program for carrying out one of the methods described herein is recorded.

A further exemplary embodiment of the method according to the invention is therefore a data stream or a sequence of signals representing the computer program for carrying out one of the methods described herein. The data stream or the sequence of signals can be configured, for example, for being transferred via a data communication connection, for example via the Internet.

A further exemplary embodiment comprises a processing device, for example a computer or a programmable logic component, which is configured or adapted for carrying out one of the methods described herein.

A further exemplary embodiment comprises a computer on which the computer program for carrying out one of the methods described herein is installed.

A further exemplary embodiment according to the invention comprises a device or a system designed to transmit a computer program for carrying out at least one of the methods described herein to a receiver. The transmission can be effected electronically or optically, for example. The receiver can be, for example, a computer, a mobile device, a memory device or a similar device. The device or the system can comprise, for example, a file server for transmitting the computer program to the receiver.

In some exemplary embodiments, a programmable logic component (for example a field programmable gate array, an FPGA) can be used to carry out some or all functionalities of the methods described herein. In some exemplary embodiments, a field programmable gate array can interact with a microprocessor in order to carry out one of the methods described herein. Generally, in some exemplary embodiments the methods are carried out on the part of an arbitrary hardware device. The latter can be universally usable hardware such as a computer processor (CPU) or hardware specific to the method, such as an ASIC, for example.

The exemplary embodiments described above merely constitute an illustration of the principles of the present invention. It goes without saying that modifications and variations of the arrangements and details described herein will be apparent to other persons skilled in the art. Therefore, it is intended that the invention should only be restricted by the scope of protection of the following patent claims and not by the specific details that have been presented on the basis of the description and the explanation of the exemplary embodiments herein.

What is claimed is:

1. A device for executing a program, the device comprising:
    a central processing unit; and
    a signature module configured to calculate a signature on the basis of instructions and to store the signature in a signature register,
    wherein calls of interrupt routines or subroutines occur during execution of the program by the central processing unit,
    wherein the device for executing the program is configured if a call of an interrupt routine takes place, to read out the signature assigned to the interrupted program from the signature module by means of a program instruction of the interrupt routine and to store the signature, and to write the stored signature to the signature module before leaving the interrupt routine by means of a program instruction of the interrupt routine, and if a call of a subroutine takes place, to adapt the signature in the signature register to a signature of the subroutine before the call of the subroutine by means of a program instruction that brings about a relative change in the signature, and, after a return from the subroutine, by means of a further program instruction that brings about a relative change in the signature, to adapt the signature in the signature register to a signature of the program section from which the call of the subroutine took place,
    wherein the signature module comprises a signature collection unit configured to provide the signature which is stored in the signature register, and an interrupt information interface with the central processing unit configured to receive interrupt information from the central procesing unit and an interrupt information evaluation unit confiugred to set an activity state of the signature calculation unit, such that the signature calculation unit is active when at least one first condition of the interrupt information is present, and that the signature calculation unit is inactive when at least one second condition is present, and the signature resister maintains a signature determined last by the calculation unit over a corresponding inactivity period.

2. The device as claimed in claim 1, wherein the device for executing the program is further configured to carry out a check of the signature during the execution of the called interrupt routine or the called subroutine.

3. The device as claimed in claim 1, wherein the device for executing the program is further configured to activate a signature calculation for the interrupt routine or the subroutine.

4. The device as claimed in claim 1, wherein the device for executing the program is further configured to save, by means of a program instruction, a state of the signature module for a routine being executed at the point in time of the call of the interrupt routine or of the subroutine, and, before leaving the interrupt routine or the subroutine, to reestablish the state of the signature module for the routine being executed at the point in time of the call of the interrupt routine or of the subroutine, by means of a program instruction.

5. The device as claimed in claim 1, wherein, before a call of the subroutine takes place, the signature is updated by the corresponding program instruction for adapting the signature, such that, upon proper calling of the subroutine, the signature upon the call of the subroutine matches a start reference signature value assigned to a start of the subroutine.

6. The device as claimed in claim 1, wherein, after a return from the subroutine, the signature is updated by the corresponding program instruction for the relative change in the signature in such a way that, upon proper returning from the subroutine to the program, the signature at a defined point of the program matches a reference signature value of the program assigned to the defined point.

7. The device as claimed in claim 6, wherein the return from the subroutine is assigned an end reference signature value which the signature in the signature register matches upon proper execution of the subroutine and which is also assigned to a return destination in the calling program section as reference signature value, wherein the signature in the signature register remains the same upon the return and is checked by the calling program section or is updated by means of a relative change in the signature in such a way that at a point in the calling program section a resulting signature value, upon proper execution, matches a second reference signature value assigned to the point in the calling program section.

8. The device as claimed in claim 7, wherein the start reference signature value and/or the end reference signature value are derived as a function of an address or of a name of the subroutine.

9. The device as claimed in claim 7, wherein the start reference signature value and/or the end reference signature value are chosen randomly, differently in pairs, identically for groups of functions or identically in each case for all functions.

10. The device as claimed in claim 1, wherein the device for executing the program is further configured to update the signature in the context of the interrupt routine or the subroutine by means of a program instruction, such that, upon proper execution of the interrupt routine or of the subroutine, the signature at a defined point of the interrupt routine or of the subroutine matches a reference signature value assigned to the defined point of the interrupt routine or of the subroutine.

11. The device as claimed in claim 1, wherein the subroutine is called in the form of an indirect function call, and wherein the signature is adapted by determining an update value on the basis of a unique identifier of the subroutine and modifying the signature by means of the update value.

12. The device as claimed in claim 11, wherein the unique identifier of the indirectly called subroutine is based on at least one of: a memory address of the subroutine; a name of the subroutine; a result of an assignment mapping for the identifier; an entry in an assignment table for the identifier; and a fixed constant, which is identical for all indirectly called functions.

13. The device as claimed in claim 11, wherein the update value is determined by the evaluation of at least one of an evaluation of an update value mapping and an evaluation of an update value table.

14. The device as claimed in claim 1, wherein the signature module comprises the signature register.

15. A device comprising a signature module configured to calculate a signature during execution of a program by a central processing unit based on program instructions to the central processing unit and to store the signature in a signature register of the signature module, the signature module comprising:
   a calculation unit configured to generate a signature value based on program instructions executed on the central processing unit;
   an interrupt information interface configured to receive interrupt information from the central processing unit; and
   an interrupt information evaluation unit configured to determine an activity state of the calculation unit based on the interrupt information, such that the calculation unit is active when at least one first condition of the interrupt information is met, in order, in the course of an interrupt routine being carried out, to calculate a signature based on program instructions of the interrupt routine and to store it in the signature register; and that the calculation unit is inactive when at least one second condition is met, and the signature register maintains a signature determined last by the calculation unit.

16. The device as claimed in claim 15, wherein the interrupt information comprises an interrupt identifier indicating which interrupt is currently being executed on the central processing unit.

17. The device as claimed in claim 16, wherein the interrupt information evaluation unit comprises an identifier register configured to store a configured interrupt identifier indicating that the calculation unit is active for a current interrupt routine having a corresponding interrupt identifier.

18. The device as claimed in claim 17, wherein the interrupt information evaluation unit comprises a comparator configured to compare the interrupt identifier and the configured interrupt identifier.

19. The device as claimed in claim 17, wherein the identifier register is configured to store a configured activity state of the calculation unit, which state is taken into account when determining an activity state of the calculation unit.

20. The device as claimed in claim 17, further comprising a configuration interface configured to configure the identifier register by means of a program instruction.

21. A method for calculating a signature based on instructions executed by a central processing unit during execution of a program, and for storing the signature in a signature register of a signature module, wherein interrupt requests or calls of subroutines occur during the execution of the program by the central processing unit, the method comprising:
   reading out, if an interrupt request is received, the signature assigned to the interrupted program from the signature module by means of a program instruction of an interrupt routine assigned to the interrupt request,
   storing the signature by means of a program instruction of the interrupt routine,
   writing the stored signature to the signature module by means of a program instruction of the interrupt routine before leaving the interrupt routine, and, if a call of a subroutine takes place, adapting the signature in the signature register to a signature of the subroutine by means of a program instruction that brings about a relative change in the signature, before the call of the subroutine;
   adapting the signature in the signature register to a signature of a program section of the program from which the subroutine was called, by means of a further program instruction that brings about a relative change in the signature, after a return from the subroutine to the program section;
   receiving interrupt information from the central processing unit via an interrupt information interface of the signature module;
   setting an activity state of the signature calculation, such that the signature calculation is active when at least one first condition is present and that the signature calculation is inactive when at least one second condition is present; and
   maintaining a signature determined last over a corresponding inactivity period, if the signature calculation is inactive.

22. The method as claimed in claim 21, further comprising checking the signature during execution of the called interrupt routine or the called subroutine.

23. The method as claimed in claim 21, further comprising activating a signature calculation for the interrupt routine or the subroutine.

24. The method as claimed in claim 21, further comprising:
- saving a state of the signature module for a routine that is being executed at the point in time of the call of the interrupt routine or of the subroutine, by means of a program instruction; and
- reestablishing, by means of a program instruction before leaving the interrupt routine or if the return from the subroutine takes place, the state of the signature module for the routine being executed at the point in time of the call of the interrupt routine or subroutine.

25. The method as claimed in claim 21, wherein, if the return from the subroutine takes place, the signature is updated by the corresponding program instruction for adapting the signature in such a way that, upon proper return from the subroutine to the program, the signature at a defined point of the program matches a reference signature value of the program that is assigned to the defined point.

26. The method as claimed in claim 21, wherein after the return from the subroutine, the signature is updated by the corresponding program instruction for the relative change in the signature in such a way that, upon proper returning from the subroutine to the program, the signature at a defined point of the program matches a reference signature value of the program assigned to the defined point.

27. The method as claimed in claim 26, wherein the return from the subroutine is assigned an end reference signature value, which the signature in the signature register matches upon proper execution of the subroutine and which is also assigned to a return destination in the calling program section as reference signature value, wherein the signature in the signature register remains the same upon the return and is updated by the cal ling program section by means of a relative change in the signature in such a way that at a point in the calling program section a resulting signature value, upon proper execution, matches a second reference signature value assigned to the point in the calling program section.

28. The method as claimed in claim 27, wherein the start reference signature value and/or the end reference signature value are derived as a function of an address or of a name of the subroutine.

29. The method as claimed in claim 27, wherein the start reference signature value and/or the end reference signature value are chosen randomly or are identical in each case for all functions.

30. The method as claimed in claim 21, further comprising updating the signature in the context of the interrupt routine or the subroutine by means of a program instruction, such that, upon proper execution of the interrupt routine or of the subroutine, the signature at a defined point of the interrupt routine or of the subroutine matches a reference signature value assigned to the defined point of the interrupt routine or of the subroutine.

31. The method as claimed in claim 21, wherein the subroutine is called in the form of an indirect function call, and wherein the signature is adapted by determining an update value on the basis of a unique identifier of the subroutine and modifying the signature by means of the update value.

32. The method as claimed in claim 31, wherein the unique identifier of the indirectly called subroutine is based on at least one of: a memory address of the subroutine; a name of the subroutine; a result of an assignment mapping for the identifier; an entry in an assignment table for the identifier; and a fixed constant, which is identical for all indirectly called functions.

33. The method as claimed in claim 31, wherein determining the update value comprises the evaluation of at least one of an evaluation of an update value mapping and an evaluation of an update value table.

34. The method as claimed in claim 21, further comprising evaluating an interrupt identifier indicating which interrupt is currently being executed on the central processing unit.

35. The method as claimed in claim 34, further comprising storing a configured interrupt identifier in an identifier register of an interrupt information evaluation unit, wherein the configured interrupt identifier indicates that the signature calculation is active for a current interrupt routine having a corresponding interrupt identifier.

36. The method as claimed in claim 35, further comprising comparing the interrupt identifier and the configured interrupt identifier in order to conclude about the activity state of the signature calculation from a result of the comparison.

37. The method as claimed in claim 35, further comprising storing a configured activity state of the signature calculation, the state being taken into account when determining the activity state of the signature calculation.

38. The method as claimed in claim 35, further comprising configuring an identifier register by means of a program instruction.

39. The method as claimed in claim 21, further comprising receiving an interrupt request and executing a corresponding context change before storing the signature assigned to the interrupted program.

* * * * *

UNITED STATES PATENT AND TRADEMARK OFFICE
CERTIFICATE OF CORRECTION

PATENT NO. : 10,515,206 B2
APPLICATION NO. : 13/409369
DATED : December 24, 2019
INVENTOR(S) : B. Gammel et al.

Page 1 of 1

It is certified that error appears in the above-identified patent and that said Letters Patent is hereby corrected as shown below:

In the Claims

Column 24, Line 27 (Claim 1, Line 33) please change "procesing unit" to -- processing unit --
Column 24, Line 28 (Claim 1, Line 34) please change "confugred to" to -- configured to --
Column 27, Line 36 (Claim 27, Line 8) please change "the cal ling" to -- the calling --

Signed and Sealed this
Seventeenth Day of March, 2020

Andrei Iancu
*Director of the United States Patent and Trademark Office*